United States Patent [19]

Harata et al.

[11] 4,216,459
[45] Aug. 5, 1980

[54] SIGNAL SWITCHING SYSTEM FOR ACTUATING WINKING LIGHTS TO BE USED FOR TWO-WHEELED VEHICLES

[75] Inventors: Shoichi Harata, Kasugai; Hirotsugi Kobayashi; Sohei Hibino, both of Aichi, all of Japan

[73] Assignee: Kabushiki Kaisha Tokai Rika Denki Seisakusho, Kasugai, Japan

[21] Appl. No.: 16,611

[22] Filed: Mar. 1, 1979

[30] Foreign Application Priority Data

Mar. 2, 1978 [JP] Japan ................................. 53-26682

[51] Int. Cl.$^2$ .............................................. B62J 3/00
[52] U.S. Cl. ...................................... 340/134; 340/73; 200/61.27
[58] Field of Search ...................... 340/54, 73, 84, 134; 200/61.27, 61.44, 61.54

[56] References Cited

U.S. PATENT DOCUMENTS

| 3,931,529 | 1/1976 | Williamson, Jr. | 340/134 |
| 4,097,700 | 6/1978 | Okazaki | 200/61.27 |

Primary Examiner—Alvin H. Waring
Attorney, Agent, or Firm—Wenderoth, Lind & Ponack

[57] ABSTRACT

A signal switching system for actuating winking lights to be used for motor vehicles, for example, two-wheeled vehicles comprises an operational lever resiliently maintained in a substantially upward direction; one movable electrical contact portion for sending out an operational signal for actuating the winking signals, which is to be movable toward right and left with respect to a neutral state thereof for selectively contacting one of fixed contacts in accordance with a corresponding movement of the operational lever with respect to a neutral position while being arranged to be resiliently back to the neutral state thereof; and a cancelling signal switch means to send out a signal for winking signals to be put off when the operational lever is pushed substantially downward at the neutral position thereof.

6 Claims, 3 Drawing Figures

SIGNAL SWITCHING SYSTEM FOR ACTUATING WINKING LIGHTS TO BE USED FOR TWO-WHEELED VEHICLES

BACKGROUND OF THE INVENTION

This invention relates to a two-wheeled vehicle or a motorcycle, or more particularly, to a switching system to be mounted on a handle stem of two-wheeled vehicle or motorcycle for properly actuating winking lights to be specifically used for an indication purpose of a right or left turning of the motorcycle.

Commonly, a switch means for actuating the turning signals of the motorcycle is assembled into a small casing with a head knob of an operational lever for changing-over the switch means being arranged to be projected from the casing mentioned above, so that the switch means is capable of being compactly mounted on the handle stem of the motorcycle and further, being operable by just turning the above-mentioned knob with a thumb of a driver's hand grasping a handle grip when the motorcycle is to be turned from its forward travelling direction. However, the switch means of the above-described type is simply arranged to be actuated by selectively turning the operational lever mentioned above toward right and left from a neutral position thereof with reference to a direction to be turned, so that the winking signals prepared for respective turning directions can be correspondingly effected in respective, electrical ON modes. Furthermore, the effect mentioned above is to be cancelled by manually bringing the above-mentioned operational lever back into the neutral position thereof soon after the turning operation is accomplished. The necessity of the switch means involving such a series of complicated actuations has been inevitable for the motorcycle, since such a turning direction indicator system commonly provided for conventional motor vehicle and arranged to be fully automatically controlled in response to the directional turning deviation of a steering shaft with respect to the straight travelling direction, can not be provided for such the motorcycle from a standpoint of difficulties in mechanical arrangements concerned. In spite of an easy technical arrangement to be involved, it is apparent that two staged manual operation inherent in the above-described prior switch means is rendered to be quite dangerous from a standpoint of the safety driving, since the driver cannot help somewhat paying an attention to the above-mentioned operation for every turning of the travelling and thereby, cannot concentrate on steering and holding the handle of motorcycle during travelling.

Recently, to overcome the above-mentioned problems concerning the safety operation of the switch means for actuating the winking lights, a switching system which is provided with a turning signal switch means for actuating and cancelling the change-over mode of the above-mentioned switch means therethrough, has been proposed. More specifically, according to the recent switching system mentioned above, the switching, operational lever is arranged to be held in a backwardly urged state thereof with respect to the driving direction while being capable of being resiliently brought back to the neutral state from the selectively oscillated right and left states thereof. Therefore, a signal for actuating an ON mode of the winking lights can be sent out, soon after the manual oscillation of the operational lever and successive return to the neutral state thereof is accomplished, but however, another signal for cancelling the above-mentioned state can be sent out through a cancelling signal switch means by a forcibly plunging of the operational lever at the above-mentioned neutral state of the switching, operational lever. Therefore, even with the help of the switching system as described in the foregoing, the difficulties involved in actuating the switching system from the standpoint of the safety driving is not satisfactorily dissolved. More specifically, the possibilities concerning erroneous operations for actuating the winking lights, in which the driver may happen to plunge the operational lever at an instance when the operational lever is moved to the extreme right or left position thereof, regardless of the driver's will, is not still avoidable.

Therefore, as long as the switching system described in the foregoing is to be equipped to the motorcycle, there is still such a disadvantage on the part of the driver that he must further constantly share his driving attention with handling the switching system, or more particularly, the operational lever.

SUMMARY OF THE INVENTION

Accordingly, an essential object of the present invention is to provide a signal switching system for actuating winking lights to be used for two-wheeled vehicles, wherein a cancelling signal for winking signals to be put off is not to be sent out with the help of an operational lever, as long as the operational lever is not fully resiliently brought back to a neutral position thereof.

Another important object of the present invention is to provide a signal switching system for actuating winking lights to be used for two-wheeled vehicles of the above-described type, which does not include a forwardly pushing or plunging operational step of an operational lever, to send out a cancelling signal for winking lights to be put off.

A further object of the present invention is to provide a signal switching system for actuating winking lights to be used for two-wheeled vehicles of the above-described type, which is easily handled and highly efficient in use.

A still further object of the present invention is to provide a signal switching system for actuating winking lights to be used for two-wheeled vehicles of the above-described type, which is simple in structure and can be manufactured at low cost.

In accomplishing these and other objects according to one preferred embodiment of the present invention, there is provided a signal switching system for actuating winking lights to be used for two-wheeled vehicles. The above-mentioned system of the present invention comprises a pair of covering portions whose one portion internally provided with a pair of supporting portions; a turning signal switch means interposed by the paired supporting portions and including a switch casing, an insulator having a plurality of fixed contacts on a side surface thereof and secured to the switch casing at respective ends thereof, and a contact holder substantially horizontally slidably accommodated in the switch casing and having a pair of projections at a top surface thereof together with a movable contact to be in contact with one of the fixed contact; an operational lever whose one end is projected from the covering portions while at least one portion of the operational lever is connected to the one covering portion, with a plurality of protruded portions being provided at an upper surface thereof; a coil spring disposed below the operational lever while being in a relatively vertically resilient state thereof against the operational lever with reference to a base portion of the one casing portion, a covering board covering the operational lever being in the upwardly urging state; a pair of springs causing the contact holder to be resiliently brought back to the neutral state thereof when the external force through the operational lever is released; and a cancelling signal switch means including a contacting member and an insulating board, while the contacting member is mounted on the insulating board secured to the lower casing portion, with a portion of the contacting member being to be spacedly positioned so as to be contacted by the operational lever pushed substantially downward at the neutral position thereof, whereby the contact holder is capable of being selectively moved toward right and left with respect to the neutral state thereof through an engagement between one of the projections and the operational lever in accordance with a corresponding movement of the operational lever resiliently maintained in a substantially upward direction with respect to the neutral position, and furthermore, the cancelling signal switch means can be in ON mode with a signal for the winking lights to be put off being sent out when the operational lever is positioned in the neutral position thereof.

By the arrangement as described in the foregoing, the cancelling switching means is to be disposed just below the operational lever and to be actuated to be in ON mode, with a signal for the winking lights to be put off being sent out at the same time, only when the operational lever is forcibly downwardly lowered to contact the contacting member at the neutral position thereof. Therefore, the unexpected erroneous handling of the switching system or more particularly, the operational lever, can not be brought about in any driving conditions of motorcycles.

BRIEF DESCRIPTION OF THE DRAWINGS

These and other objects and features of the present invention will become apparent from the following description taken in conjunction with the preferred embodiment thereof with reference to the accompanying drawings in which.

Figure 1:
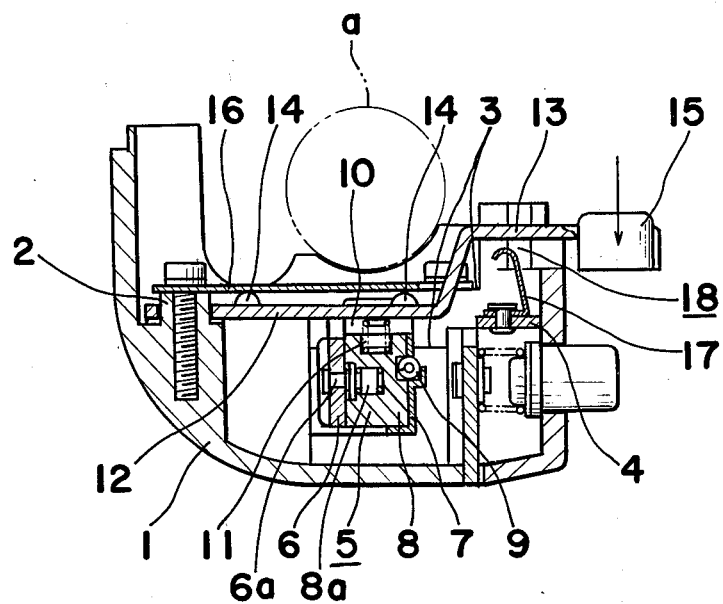
FIG. 1 is a central elevational view, partly in section, of one of embodiments of a switching system for actuating winking signals to be used for motorcycles of the present invention, with an upper covering casing portion being removed.

Before the description of the present invention proceeds, it is to be noted that like parts are designated by like reference numerals throughout several views of the accompanying drawings, as long as the difference in reference numerals for like parts found in several embodiments of the present invention is specifically so indicated.

DETAILED DESCRIPTION OF THE INVENTION

Figure 2:
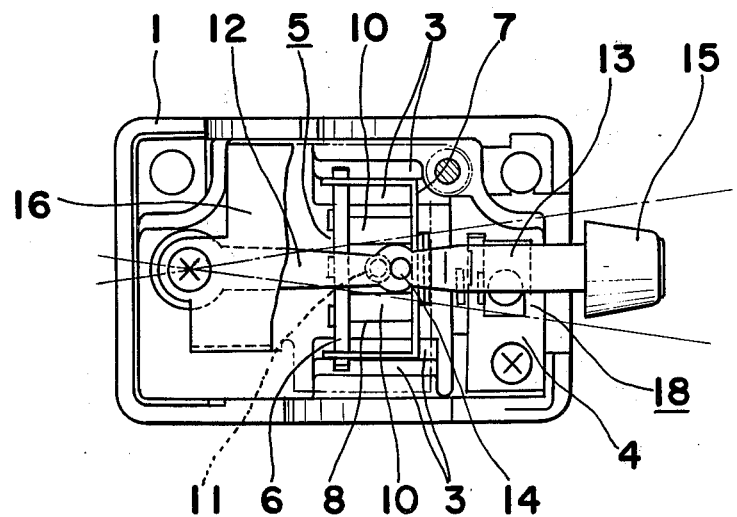
FIG. 2 is a top plan view, partly in section, of the embodiment shown in FIG. 1.

Referring first to FIGS. 1 and 2, there is shown one preferred embodiment of a switching system utilized for actuating winking lights and mounted on a handle stem of a motorcycle, according to the present invention. Although only a lower covering casing portion 1 is shown in these figures, the switching system, as a whole, is defined to be divided into two covering casing portions, and is to be secured to the handle stem a with these paired covering casing interposing the handle stem therebetween.

The switching system according to the present invention comprises a pair of covering casings whose lower portion 1 including a shaft portion 2 and a pair of supporting portions 3 and 3; a turning signal switch means 5 interposed by the paired supporting portions 3 mentioned above and including a switch casing 7, an insulator 6 having a plurality of fixed contacts 6a and a contact holder 8 having a pair of projections 10 and 10 at the top surface thereof and provided with a movable contact 8a; a coil spring 11 to be half accommodated in a bore provided on an upper face of the contact holder 8 while being disposed between the above-mentioned paired projections 10; a pair of springs 9 to be attached at one side of the contact holder 8; an operational lever 12 having a knob 15 at one end of a flat portion 13 which is elongated and is to be projected from the casing, to be pushed downward by a driver's thumb, and a plurality of rounded portions 14 at the upper surface thereof; a cancelling signal switch means 18 including a contacting member 17 and an insulating board 4; and a covering board 16.

More specifically, as far as the turning signal switch means 5 is concerned, the switch casing 7, which has a U-shaped cross section, is fixedly provided with the insulator 6 at the rear end thereof, while the switch casing 7 itself being fixedly interposed by the paired supporting portions 3 and 3. The contact holder 8 mentioned above is slidably accommodated in the switch casing 7, with the movable contact 8a being in resilient contact with the insulator 6, while the contact holder 8 is arranged to be maintained in a neutral mode through the paired springs 9, unless one of projections 10 is engaged by the operational lever 12, and to be forcibly driven either in the upper direction or in the lower direction as shown in FIG. 2 by the driving movement of the operational lever 12 or the knob 15. As is specifically shown in FIGS. 1 and 2, the operational lever 12 is shaped in a stepped configuration, so as to have two flat portions staged with each other with reference to a substantially horizontal reference plain. The operational lever 12 itself is, as a whole, arranged to be oscillated within the substantially horizontal reference plain while being seized at one end thereof. More specifically, the one end portion mentioned above is through the shaft 2, with a washer having a little corrugated cross section being interposed and, is covered by the cover plate so that the end portion mentioned above is seized in a little movable mode, while the other end portion is arranged to be projected from the casing so that the knob 15 is to be attached thereto.

Below the flat portion 13 of the operational lever 12, the insulating board 4 is horizontally extended, with one side end being fixedly supported by the lower casing 1. Similarly, below the other flat portion of the operational lever 12, the coil spring 11 disposed in a manner as described earlier is assembled in a manner such that an upper face of the coil spring 11 is to be in a resilient state toward the bottom flat surface of the flat portion of the operational lever 12. By the arrangement as described in the foregoing, as far as the operational lever 12 is concerned, the operational lever, as a whole, is usually held in a relatively resilient state while being urged toward substantially upward direction with respect to the lower casing 1 by means of combined stress effected by the washer assembled in the shaft 2 and the coil spring 11 assembled in the bore provided on the face of the contact holder 8. Therefore, as a result, the operational lever 12 is to urge the cover board 16 in an upward direction with the plurality rounded portions 14.

As for the operational lever arranged in a manner as just described in the foregoing, if the knob 15 is pushed substantially downward as indicated by an arrow as shown in FIG. 2, the operational lever 12 is capable of being movable in the substantially downward direction with respect to the one rear end, being accompanied by a little downward oscillation at the same time. Furthermore, the operational lever 12 can further oscillate horizontally right or left with reference to the neutral position thereof as described earlier, if the force is so exerted with the knob 15 for overcoming the resilient force to be effected by either one of springs 9.

Consequently, the operational lever 12 can oscillate towards horizontally right or left with reference to the neutral position thereof as shown in FIG. 2, to cause the movement of the contact holder 8, while the operational lever 12 is also movable in the substantially downward direction against the resilient force to be effected through the coil spring 11 when disposed in the neutral position, so that the cancelling signal switch means 18 is to be actuated through the above-mentioned movement of the operational lever 12.

Moreover, as far as the cancelling signal switch means 18 is concerned, upon the insulating board 4, the contacting member 17 to be contacted by the flat portion 13 is mounted, so that the contacting member 17 including proper electrical connecting members and the flat portion 13 constitute the cancelling signal switch means 18 when the operational lever 12 is pushed downwards to contact the contacting member 17 at the neutral position of the operational lever 12.

In the following, the functional characteristics effected by the handling operation of the embodiment shown in FIGS. 1 and 2 are detailed.

According to the above-mentioned embodiment, the operational lever 12 is horizontally oscillated either in the right direction or in the left direction as indicated by an imaginary line shown in FIG. 2, depending upon the necessity of either winking of winking lights provided on the either sides of the motorcycle, or more particularly, the turning direction of the motorcycle. Through the oscillating actuation of the operational lever 12 mentioned above with the knob 15, the movable contact 8a assembled in the contact holder 8 is to be in contact with one of the fixed contacts 6a secured to the insulator 6 through a driving force effected through the substantially horizontal movement of the operational lever 12 to specific one of the projections. Soon after the contact mentioned above is accomplished, and thereby, the turning signal switch means 5 is rendered to be ON state thereof, the operational lever 12 of the knob 15 is to be set free, so that the operational lever 12 is to be returned to the neutral state thereof through the resilient force caused by one of the paired spring 9 as specifically shown in FIG. 2. Upon completion of the above-mentioned operational procedures, a signal means (not shown here) is to receive an appropriate operational signal, to cause the winking of either the right winking lights or left winking lights to be electrically effected.

Subsequently, as soon as the operational lever 12 positioned in the neutral state thereof is downwards pushed against the resilient force caused by such as, for example, the coil spring 11, with the help of the knob 15, the flat portion 13 is brought into contact with the contacting member 17 and thereafter, the cancelling signal switch means 18 is rendered to be ON state. Thereby, similarly, upon completion of the actuation mentioned above, the above-mentioned signal means is sent out an appropriate cancelling signal, to cause the wink having been effected to be electrically stopped.

According to one modified embodiment of the present invention, the cancelling signal switch means 18 introduced in the above-mentioned embodiment can be replaced by a micro-switching means, only if the micro-switching means is arranged to be actuated following the downward forcible movement of the operational lever 12 while disposed in the neutral position as described in the foregoing.

Figure 3:
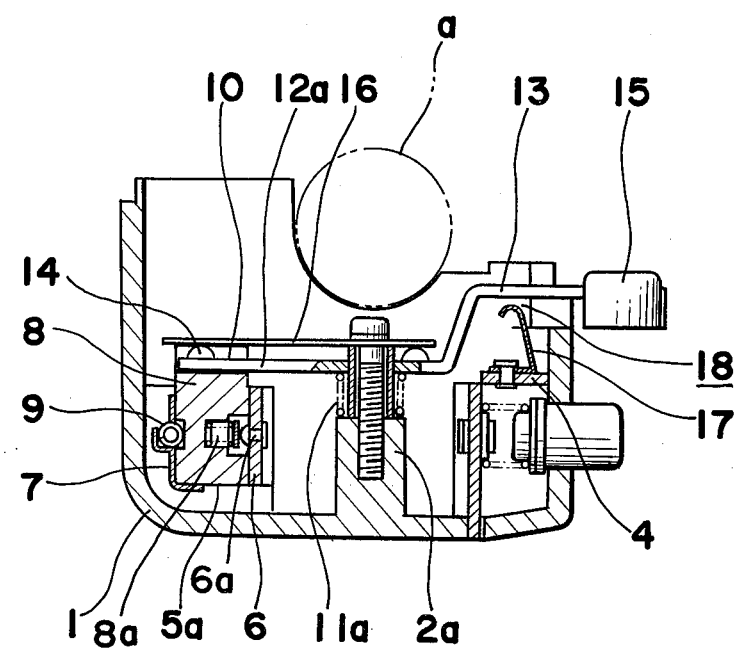
FIG. 3 is a view similar to FIG. 1, however showing one modified embodiment of the embodiment shown in FIG. 1.

Referring now to FIG. 3, there is shown one modified embodiment of the switching system according to the present invention. As far as the embodiment shown in FIG. 3 is concerned, upon a shaft 2a centrally positioned within the lower casing 1, an approximately central portion of the operational lever 12 is resiliently mounted with the help of a coil spring 11a. Furthermore, a winker switching means 5a having the movable portion 8 is disposed in the rear portion of the casing with respect to the position of the shaft 2a, wherein the rear end portion of an operational lever 12a is connected to the movable portion 8 of the winker switching means 5a. The rest of parts of the arrangements of the modified embodiment shown in FIG. 3 is approximately the same as those of the embodiment shown in FIGS. 1 and 2.

According to a recent, conventional switching system for actuating the winking lights provided for motorcycles of the above described type, the operational lever is arranged to be held in a backwardly urged state thereof with respect to the driving direction while being also capable of being resiliently brought back to the neutral state from the selectively oscillated right and left states thereof. Therefore, a signal for actuating the winking lights can be sent out, soon after the manual oscillation of the operational lever and successive return to the neutral state thereof, is accomplished, but another signal for cancelling the above-mentioned state can be sent out through a cancelling signal switch means by a forcible plunging of the operational lever. Therefore, even with the help of the prior switching system as just described above, the difficulties involved in actuating the switching system from the standpoint of view of the safety driving is not satisfactorily solved. More specifically, the possibilities concerning erroneous operations for actuating the winking lights, in which the driver may happen to plunge the operational lever at an extreme right or left position thereof, regardless of the driver's will, can not still be avoidable.

Therefore, as long as the switching system described in the foregoing is to be equipped on the motorcycle, the driver is still to take such a disadvantage that he must further constantly share his driving attention with handling the switching system or, more particularly, the operational lever.

On the contrary to the disadvantages as described in the foregoing, according to the switching system of the present invention, the cancelling signal switch means 18 is to be disposed just below the above-mentioned lever 12, wherein the above-mentioned means 18 is arranged to be constituted or actuated only when the above-mentioned lever 13 or 12 being in the neutral position thereof is forcibly downwardly lowered to contact the contacting member 17 by means of the knob 15.

Therefore, according to the arrangement of the present invention, the unexpected erroneous handling of the switching system, or more particularly, the operational lever, can not be brought about in any driving conditions of motorcycles.

Furthermore, the switching system of the present invention has quite simple mechanical and electric constructions and therefore, can be manufactured at low cost while each being highly efficient in use.

Although the present invention has been fully described by way of example with reference to the accompanying drawings, it is to be noted that various changes and modifications are apparent to those skilled in the art. Therefore, unless otherwise such changes and modifications depart from the scope of the present invention, they should be construed as included therein.

What is claimed is:

1. A signal switching system for actuating winking lights to be used for two-wheeled vehicles, in which at least one movable electrical contact portion for sending out operational signals for actuating said winking lights is capable of not only being selectively movable toward right and left with respect to a neutral state thereof for selectively contacting one of fixed contacts in accordance with a corresponding movement of an operational lever connected to said movable electrical contact at one portion thereof with respect to a neutral position corresponding to said neutral state of said movable electrical contact portion, but also being arranged to be resiliently brought back to said neutral state thereof, further comprises means to make said operational lever to be resiliently maintained in a substantially upward direction, and a cancelling signal switch means to send out a cancelling signal for winking lights to be put off when said operational lever including said means is pushed substantially downward at said neutral position thereof.

2. A signal switching system for actuating winking lights to be used for two-wheeled vehicles as claimed in claim 1, wherein said means to make operational lever to be resiliently maintained in a substantially upward direction comprises at least one coil spring to be spaced below said operational lever while being in a resilient state thereof.

3. A signal switching system for actuating winking lights to be used for two-wheeled vehicles as claimed in claim 1, wherein said cancelling signal switch means is microswitch means.

4. A signal switching system for actuating winking lights to be used for two-wheeled vehicles as claimed in claim 2, wherein said cancelling signal switch means is a microswitch means.

5. A signal switching system for actuating winking lights to be used for two-wheeled vehicles, which comprises a pair of covering portions whose one portion internally provided with a pair of supporting portions; a turning signal switch means interposed by said paired supporting portions, said turning signal switch means including a switch casing, an insulator having a plurality of fixed contacts on one side surface thereof and secured to said switch casing at respective ends thereof and a contact holder substantially horizontally slidably accommodated in said switch casing and having a pair of projections at a top surface thereof together with a movable contact to be in contact with one of said fixed contacts; an operational lever whose one end is projected from said covering portions while at least one portion of said operational lever being connected to said one covering portion, with a plurality of protruded portions being provided at an upper surface of said operational lever; a coil spring disposed below said operational lever while being in a relatively vertically resilient state thereof against said operational lever with reference to a base portion of said one casing portion, so that said contact holder is capable of being selectively moved toward right and left with respect to a neutral state thereof through an engagement between one of said projections and said operational lever in accordance with a corresponding movement of said operational lever resiliently maintained in a substantially upward direction with respect to a neutral position; a covering board covering said operational lever being in said upwardly urging state; a pair of springs causing said contact holder to be resiliently brought back to said neutral state thereof when said engagement is released; and a cancelling signal switch means including a contacting member and an insulating board while said contacting member being mounted on said insulating board secured to said lower casing portion, a portion of said contacting member being to be spacedly positioned so as to be contacted by said operational lever pushed substantially downward at said neutral position thereof, so that said cancelling signal switch means is to be in ON mode with a signal for said winking lights to be put off being sent out.

6. A signal switching system for actuating winking lights to be used for two-wheeled vehicles as claimed in claim 5, wherein said cancelling signal switch means is a microswitch means.

* * * * *